Patented Aug. 24, 1943

2,327,670

UNITED STATES PATENT OFFICE 2,327,670

ISOMERIZING HYDROCARBONS

William E. Ross and John Anderson, Berkeley, Calif., assignors to Shell Development Company, San Francisco, Calif., a corporation of Delaware No Drawing. Application January 24, 1942, Serial No. 428,116

13 Claims. (Cl. 260—683.5)

The present invention relates to the catalytic isomerization of hydrocarbons and relates more particularly to an improved process and catalyst for the conversion of normal or branched chain saturated hydrocarbons having at least four carbon atoms to the molecule to branched and more highly branched chain saturated hydrocarbons.

Of the processes proposed heretofore for the catalytic isomerization of hydrocarbons, those utilizing catalysts comprising an aluminum halide are by far the most effective. Though a large number of metal halides act similarly to the aluminum halides in many reactions such as cracking, polymerization and alkylation of hydrocarbons, these materials nevertheless generally possess relatively little if any activity as isomerization catalysts. It is now well known that the effect of a catalyst in its application to other hydrocarbon reactions is no criterion of its ability to catalyze the isomerization reaction. Of the aluminum halides, the chloride is in general preferred because of its availability and relatively lower cost. Aluminum chloride per se, however, even in the presence of a hydrogen halide promoter, is not an entirely satisfactory catalyst for hydrocarbon isomerization. The rate at which isomerization can be effected in its presence at relatively low temperatures is usually too slow for practical consideration. At higher temperatures the catalyst tends to cause degradation reactions which lead to the formation of by-products which, even when formed in relatively small amounts, coat the catalyst particles, thereby preventing effective contact of catalyst and hydrocarbon and causing the catalyst to agglomerate into a sticky mass. Furthermore, the use of aluminum chloride per se brings about serious difficulties in the handling of reactants and catalyst within the system, even in the absence of the sticky reaction product formed during the course of the process. This is especially the case when a relatively large ratio of catalyst to hydrocarbon is used.

In order to overcome these difficulties, aluminum chloride in combination with a support material has been used. The use of these solid catalysts, although superior to the use of aluminum chloride per se, has certain disadvantages. Thus the available degree of contact between reactants and catalyst is generally insufficient to enable effective large scale operation in the liquid phase. This is particularly important in view of the fact that the isomerization of hydrocarbons having more than four carbon atoms to the molecule is generally effected more advantageously in the liquid phase. A further disadvantage often inherent in the use of solid catalysts resides in the difficulty of efficiently controlling the catalyst bed temperature, due to the poor heat conductivity of most of the available solid isomerization catalysts. A considerable portion of these catalysts often consists of inert support material, thereby requiring the use of large reaction zones for relatively small amounts of the active catalyst constituent. It is therefore readily apparent that a process employing a liquid catalyst which is not only effective in its ability to catalyze the hydrocarbon isomerization, but which will maintain its fluidity and activity at temperatures sufficiently low to permit its use for the treatment of the more readily degraded hydrocarbons, is highly advantageous.

It has now been found that with the aid of the novel fluid catalyst melts of the invention, saturated hydrocarbons can be isomerized efficiently at relatively rapid rates and at temperatures sufficiently low to preclude any substantial degradation of even the more readily degraded saturated hydrocarbons such as, for example, normal pentane. The use of these catalyst melts eliminates many of the disadvantages inherent in the use of solid catalysts.

In accordance with the process of the invention, the hydrocarbon to be isomerized, alone or in admixture with one or more hydrocarbons which may or may not be capable of isomerization under the conditions of execution of the process, and/or in the presence of one or more non-hydrocarbon diluents, is contacted under isomerizing conditions of temperature and pressure with a liquid melt consisting of a mixture comprising aluminum chloride, sulfur dioxide and zinc chloride.

The proportions of the relative components in the catalyst melt may vary within the scope of the invention. The degree of catalytic activity as well as other properties of the melt affecting its efficient use in the isomerization of a particular hydrocarbon are, however, greatly dependent upon its composition. Thus it has been found that when the molar proportion of sulfur dioxide present in the melt substantially exceeds that of the aluminum chloride, the catalyst is relatively ineffective for the isomerization of butane. The amount of zinc chloride present in the melt is preferably in excess of about six mol per cent of the ternary mixture but not above about twenty mol per cent. In general the catalyst melts used in the process of the invention preferably comprise the components in the following proportions in mol per cent: AlCl₃, 40–83; SO₂, 10–40; ZnCl₂, 7–20. It is to be understood that the proportions of the three components of the melts as given throughout the specification and claims refer to the amounts in which these are mixed to obtain the catalyst, and that once they are mixed they combine in part with one another to form complex salts in a manner and to a degree which cannot readily be determined. A melt particularly effective for the isomerization of open chain paraffin hydrocarbons comprises the AlCl₃, SO₂, and ZnCl₂ in a molar ratio of about 2:1:0.5 (58:29:13 mol per cent), respectively. The efficiency of this catalyst is shown by its ability to isomerize butane with a conversion of normal butane to isobutane of almost 60 mol per cent at a temperature of only 80° C. and relatively short contact time. An important advantage of the invention resides in its ability to effect the isomerization of hydrocarbons in the presence of an active catalyst which is in the liquid state at relatively low temperatures. Thus the catalyst melt comprising AlCl₃, SO₂ and ZnCl₂ in a molar ratio of about 2:1:0.5 respectively, remains fluid at temperatures below about 80° C. It is thus apparent that the use of this catalyst enables the isomerization of even the more readily degraded hydrocarbons, such as normal pentane, in the liquid phase without any substantial hydrocarbon decomposition.

The advantages of the ternary catalyst melts of the invention as catalysts for hydrocarbon isomerization are not possessed by any single one or a combination of any two of its components. Thus neither SO₂ nor ZnCl₂ has any appreciable effect upon the hydrocarbon isomerization reaction. A mixture of aluminum chloride and sulfur dioxide in a molar ratio of about 1:0.5 respectively, although possessing ability to catalyze hydrocarbon isomerization, has a melting point of about 145° C. Since the process must be executed at a temperature in excess of the melting point of the catalyst to avoid freezing of any substantial part thereof within the system, it is apparent that such a higher melting mixture is not suited to the treatment of paraffinic hydrocarbons, especially the more readily degraded paraffins such as, for example, normal pentane, which is completely degraded in the presence of these materials at temperatures of 120° C. and higher. The lower temperatures at which the ternary catalyst melts can be used in the liquid state furthermore enable the attainment of equilibrium mixtures of normal and isoparaffins containing greater proportions of the isoparaffin than is possible with the use of higher melting mixtures.

Though an important advantage of the process of the invention resides in its use at relatively low temperatures, it is to be understood that it is not limited thereto and may be advantageously employed at higher temperatures, for example, up to about 150° C., for the isomerization, preferably in the vapor phase, of the less readily degraded saturated hydrocarbons such as butane. These advantages comprise a greater degree of fluidity, assuring improved contact of reactants and catalyst and a greater facility in the handling of the reaction mixture within the system. The use of the lower melting catalysts permits greater variations in catalyst composition without the danger of freezing part of the catalyst in the reaction zone. This increased range in permissible catalyst composition also permits the properties of the melt, such as its catalytic activity, to be modified to a greater degree. This is highly advantageous since it is often desirable to modify the activity of a catalyst melt in conformity with changes in operating conditions or changes in the hydrocarbon feed to the process.

In preparing the catalyst melts of the invention the components may be combined at temperatures below or above the melting point of the desired mixture. Thus the catalyst melt may be prepared in situ by charging aluminum chloride into the reactor, passing sulfur dioxide therethrough until the desired ratio of aluminum chloride to sulfur dioxide has been attained and thereafter adding the zinc chloride. The resulting mixture is thereupon brought to the desired operating temperature.

Since pentane is particularly prone to undergo decomposition at higher temperatures in the presence of aluminum chloride catalysts, the process of the invention may be applied with particular advantage to the conversion of this hydrocarbon to isopentane. However, as stated above, the invention may be applied advantageously to the isomerization of the more stable paraffinic hydrocarbons such as, for example, butane.

The invention is, however, not limited to the treatment of materials consisting essentially of a single hydrocarbon. Thus the process of the invention may be applied to the treatment of hyrocarbon mixtures comprising normal butane and/or normal pentane. For example, suitable starting materials are saturated hydrocarbon mixtures comprising, besides a substantial amount of normal butane and/or normal pentane, one or more other saturated hydrocarbons which may or may not be capable of isomerizing under the conditions of execution of the process. The invention thus provides a practical process for converting the normal butane and normal pentane contents of commercial saturated hydrocarbon fractions obtained from such sources as natural gas, products of thermal and catalytic hydrocarbon conversion operations, etc., to their branched chain isomers. Especially suitable mixtures of hydrocarbons are the so-called butane-butylene fractions and pentane-amylene fractions from which unsaturated hydrocarbons have been removed to at least a substantial degree. Treatment of the mixtures obtained, for instance as by-products in the sulfuric acid alkylation of isoparaffins, results in materially increasing their content of branched chain isomers and converting them to suitable raw materials for re-use in the alkylation process. The process of the invention is, however, in no wise limited to the treatment of normal butane and/or pentane or saturated hydrocarbon mixtures containing them. The process may be applied generally to the catalytic isomerization of any isomerizable saturated hydrocarbon. Thus isomerizable saturated hydrocarbons having from four to ten carbon atoms may be treated in accordance with the process of the invention. While the process is particularly adapted to the isomerization of saturated open chain or paraffin hydrocarbons, it may be applied to the treatment of isomerizable naphthenic hydrocarbons such as, for example, methyl cyclopentane, dimethyl cyclopentane, methyl cyclohexane. Hyrocarbon fractions comprising substantial amounts of isomerizable saturated hydrocarbons, such as, for example, fractions of straight run gasoline, casing head gasoline, etc., may be treated in accordance with the process of the invention to produce products suitable for alkylation with olefins and which have improved ignition characteristics.

The process of the invention may be executed at temperatures ranging from the minimum temperature at which the catalyst can be maintained in the liquid state up to about 150° C. The minimum temperature at which the catalyst can be maintained in the liquid state depends upon the particular composition of the melt used. When isomerizing hydrocarbons having at least five carbon atoms to the molecule, such as for example, pentane, temperatures in the range of from about 80° C. to about 100° C. are preferably used. When isomerizing butane, temperatures preferably not above 150° C. may be employed.

The process of the invention may be effected in the vapor or liquid phase. Hyrocarbons having at least five carbon atoms to the molecule, such as, for example, pentane, are preferably isomerized in the liquid phase whereas butane may be isomerized in the vapor phase. When the isomerization is executed in the liquid phase, the pressure is of course always sufficiently high to maintain at least a substantial portion of the hydrocarbon feed in the liquid phase. In vapor phase operation of the process, pressures ranging from about atmospheric up to about 250 pounds are usually most advantageously employed. Higher pressures may, however, be used.

The hydrocarbon or hydrocarbon mixtures treated are preferably substantially free of materials which undergo side reactions such as degradation, polymerization, etc., or which combine with components of the catalyst melt under the conditions of execution of the process. Olefins, diolefins, aromatic hydrocarbons or other detrimental impurities in the hydrocarbon or hydrocarbon mixture to be treated are preferably removed prior to isomerization by a suitable pretreatment which may comprise one or more of such steps as mineral acid refining, hydrogenation, alkylation, contact with clay or a part of the spent catalyst, solvent extraction, etc.

Gases such as $H_2$, $N_2$, $CH_4$, $CO_2$, etc., may if desired be present in the reaction zone. When such gases are separately charged to the system they may be preheated prior to their introduction into any part of the reaction zone to thereby aid in maintaining the reaction temperature.

The isomerization is preferably executed in the presence of a hydrogen halide promoter such as, for example, hydrogen chloride. This may be admixed with the hydrocarbon charge prior to its introduction into the reaction zone or may be passed in part or in its entirety directly into the reaction zone at one or a plurality of intermediate points thereof. The amount of hydrogen halide used may vary widely in accordance with operating conditions. In general, an amount of hydrogen chloride equal to from about 0.3% to about 10% of the hydrocarbon charge is found to be sufficient. Higher proportions of the hydrogen halide may, however, be used.

The process of the invention is carried out in a batch, intermittent or continuous manner. A suitable reaction zone enabling efficient contact of the liquid catalyst and the hydrocarbon charge may be used. The reaction zone may comprise, for example, one or a plurality of reaction chambers containing the catalyst melt. These reactors may be connected in parallel or in series and provided with suitable means for stirring the contents and maintaining the reaction temperature therein. If desired, the reaction zone may comprise an elongated reaction zone of restricted cross-sectional area, such as an externally heated coil positioned in a furnace structure, through which an admixture of hydrocarbon feed admixed with the catalyst melt may be passed. Effluence from the reaction zone may be passed to a suitable separating zone from which entrained catalyst may be separately withdrawn and returned to the reaction zone. Hydrogen halide and unconverted hydrocarbons are separated from the reaction products and may be recycled in part or in their entirety to the inlet or any intermediate part of the reaction zone. If desired, the effluence from the reaction zone may be directly combined with olefinic hydrocarbons and subjected to alkylating conditions to effect the alkylation of the branched chain hydrocarbons with olefinic hydrocarbons.

The following examples are given to illustrate the process of the invention; it is to be understood, however, that the values given are illustrative rather than limiting.

*Example I*

Two hundred and fifty grams of normal butane in admixture with 7 grams of hydrogen chloride was treated with 290 grams of a catalyst melt consisting of $AlCl_3$, $SO_2$, and $ZnCl_2$ in the weight proportions of 67.7:16.3:16.0, respectively, in a closed vessel for 10 minutes at a temperature of 80° C. A conversion of normal butane to isobutane of 53 mol per cent was obtained.

*Example II*

Two hundred and sixty-two grams of normal butane in admixture with 1.5 grams of hydrogen chloride was treated with 228 grams of a catalyst melt consisting of $AlCl_3$, $SO_2$ and $ZnCl_2$ in the weight proportions of 73.0:17.5:9.5, respectively, in a closed vessel for 30 minutes at a temperature in the range of 80° C. to 90° C. A conversion of normal butane to isobutane of 58 mol per cent was obtained.

We claim as our invention:

1. A process for the conversion of normal and branched chain saturated hydrocarbons to branched and more highly branched chain saturated hydrocarbons respectively which comprises contacting an isomerizable saturated hydrocarbon at isomerizing conditions with a fluid melt comprising aluminum chloride, sulfur dioxide and zinc chloride in a molar ratio of about 2:1:½, respectively.

2. A process for converting pentane to isopentane which comprises contacting pentane in the liquid phase with a fluid melt comprising aluminum chloride, sulfur dioxide and zinc chloride in a molar ratio of about 2:1:½, respectively, at a temperature not exceeding about 100° C.

3. A process for converting butane to isobutane which comprises contacting butane at isomerizing conditions with a fluid melt comprising aluminum chloride, sulfur dioxide and zinc chloride in an molar ratio of 2:1:½, respectively.

4. A process for the conversion of normal and branched chain saturated hydrocarbons to branched and more highly branched chain saturated hydrocarbons respectively which comprises contacting an isomerizable saturated hydrocarbon at isomerizing conditions with a fluid melt comprising 40 to 83 mol per cent aluminum chloride, 10 to 40 mol per cent sulfur dioxide and 7 to 20 mol per cent zinc chloride.

5. A process for converting normal and branched chain paraffin hydrocarbons to branched and more highly branched chain paraffin hydrocarbons respectively which comprises contacting the paraffin hydrocarbon at isomerizing conditions with a fluid melt comprising aluminum chloride, sulfur dioxide and zinc chloride in such proportions that the mol ratio of aluminum chloride to sulfur dioxide is equal to at least 1 and the amount of zinc chloride in said melt does not substantially exceed about 20 mol percent.

6. A process for isomerizing saturated hydrocarbons which comprises contacting an isomerizable saturated hydrocarbon at isomerizing conditions with a fluid melt comprising aluminum chloride, sulfur dioxide and zinc chloride in such proportions that the mol ratio of aluminum chloride to sulfur dioxide is equal to at least 1 and the amount of zinc chloride in said melt does not substantially exceed about 20 mol per cent.

7. A process for isomerizing saturated hydrocarbons which comprises contacting an isomerizable saturated hydrocarbon in the presence of a promoting amount of a hydrogen halide at isomerizing conditions with a fluid melt comprising aluminum chloride, sulfur dioxide and zinc chloride in such proportions that the mol ratio of aluminum chloride to sulfur dioxide is equal to at least 1 and the amount of zinc chloride in said melt does not substantially exceed about 20 mol per cent.

8. A process for isomerizing saturated hydrocarbons which comprises contacting a hydrocarbon fraction essentially comprising saturated hydrocarbons having from four to ten carbon atoms to the molecule at isomerizing conditions with a fluid melt comprising a halide of aluminum, sulfur dioxide and a halide of zinc in such proportions that the mol ratio of aluminum halide to sulfur dioxide is equal to at least 1 and the amount of zinc halide in the said melt does not substantially exceed about 20 mol per cent.

9. A process for converting normal and branched chain saturated hydrocarbons to branched and more highly branched chain saturated hydrocarbons respectively which comprises contacting an isomerizable saturated hydrocarbon at isomerizing conditions with a fluid melt comprising a halide of aluminum, sulfur dioxide and a halide of zinc, the halide of aluminum constituting at least 50 mol per cent of said fluid melt.

10. A catalyst particularly effective in the isomerization of hydrocarbons consisting of a fluid melt comprising aluminum chloride, sulfur dioxide and zinc chloride in a molar ratio of about 2:1:½, respectively.

11. A catalyst particularly effective in the isomerization of hydrocarbons consisting of a fluid melt comprising 40 to 83 mol per cent aluminum chloride, 10 to 40 mol per cent sulfur dioxide and 7 to 20 mol per cent zinc chloride.

12. A catalyst particularly effective in the isomerization of hydrocarbons consisting of a fluid melt comprising aluminum chloride, sulfur dioxide and zinc chloride in such proportions that the mol ratio of aluminum chloride to sulfur dioxide is equal to at least 1 and the amount of zinc chloride in said melt does not substantially exceed about 20 mol per cent.

13. A catalyst particularly effective in the isomerization of hydrocarbons consisting of a fluid melt comprising an aluminum halide, sulfur dioxide and a halide of zinc, the aluminum halide constituting at least 50 mol per cent of said fluid melt.

WILLIAM E. ROSS.
JOHN ANDERSON.